(12) United States Patent
Schickler et al.

(10) Patent No.: US 8,698,822 B1
(45) Date of Patent: Apr. 15, 2014

(54) MANAGING VISUAL UPDATES

(75) Inventors: Jason Jeffrey Schickler, Framingham, MA (US); Donald Paul Orofino, II, Sudbury, MA (US)

(73) Assignee: The MathWorks, Inc., Natick, MA (US)

( * ) Notice: Subject to any disclaimer, the term of this patent is extended or adjusted under 35 U.S.C. 154(b) by 549 days.

(21) Appl. No.: 12/982,555

(22) Filed: Dec. 30, 2010

(51) Int. Cl.
*G06T 1/60* (2006.01)
*G06F 11/00* (2006.01)

(52) U.S. Cl.
USPC .......................... 345/530; 370/229; 370/235

(58) Field of Classification Search
None
See application file for complete search history.

(56) References Cited

U.S. PATENT DOCUMENTS

| 8,379,540 B2* | 2/2013 | Gill et al. ................. 370/254 |
| 2005/0033561 A1* | 2/2005 | Orofino, II ................. 703/1 |
| 2008/0235143 A1* | 9/2008 | Beller et al. ................. 705/63 |
| 2011/0013558 A1* | 1/2011 | Chang ................. 370/328 |

* cited by examiner

*Primary Examiner* — Joni Richer
(74) *Attorney, Agent, or Firm* — Harrity & Harrity, LLP

(57) ABSTRACT

A system is configured to: conduct asynchronous updates, of a display, based on a fixed rate when operating in an asynchronous state; determine whether to switch to a synchronous state from the asynchronous state based on the asynchronous updates; conduct synchronous updates, of the display, after switching to the synchronous state; receive a lock request, and conduct updating of the display based on the lock request. The synchronous updates may be performed independent of the fixed rate.

20 Claims, 9 Drawing Sheets

US 8,698,822 B1

MANAGING VISUAL UPDATES

BACKGROUND

Computer systems run applications that provide a variety of simulations. The applications display visual representation(s) based on data generated for the simulations. Currently, a display of a visual representation is updated every time that an update is received for the visual representation (i.e., new data is generated by the simulation). Innovations in software and computer technology have greatly increased the number, speed, and frequency of data updates that an application may generate for a visual representation of a simulation. Simulations often provide updates at such a high frequency that users are not able to perceive corresponding changes to the visual representations based on the updates. As a result, a processor may waste resources updating a display of the visual representations based on frequent individual data updates—even though a user cannot appreciate or recognize the changes in the display.

BRIEF DESCRIPTION OF THE DRAWINGS

The accompanying drawings, which are incorporated in and constitute a part of this specification, illustrate one or more implementations described herein and, together with the description, explain these implementations. In the drawings.

DETAILED DESCRIPTION

The following detailed description refers to the accompanying drawings. The same reference numbers in different drawings may identify the same or similar elements.

Overview

An implementation, described herein, may manage visual updates. A computer system may run a simulation and generate and display a visual (i.e., graphical) representation of the simulation. The simulation may generate updates (e.g., a coordinate on a graph, a number, a matrix of numbers, a string of characters, etc.). The computer system may receive each one of the updates consecutively after the update is generated. The computer system may begin updating the visual representation in a synchronous state. In the synchronous state, the computer system may update a display of the visual representation after receiving each one of the updates. For example, the simulation may draw a line on a graph. The simulation may generate coordinates of a point, for the graph, as an update. In the synchronous state, the computer system may update a display of the graph by plotting the point on the graph based on the coordinates after receiving the coordinates.

The computer system, while in the synchronous state, may determine that the simulation is generating updates at a higher rate than a predefined frequency. For example, the predefined frequency may be set to a highest frequency at which an average user may perceive a change (e.g., 20 Hz). As a result of the determination, the computer system may switch from the synchronous state to an asynchronous state. In the asynchronous state, the computer system may buffer data generated by the simulation and update the display of the visual representation based on the buffered data at a predefined rate. For example, in the asynchronous state, the computer system may buffer coordinates that are being generated for multiple points. Every 45 milliseconds, the computer system may plot the multiple points on the graph based on the buffered coordinates. The computer system, while in the asynchronous state, may determine that the simulation is no longer generating updates at the higher rate. As a result of the determination, the computer system may switch back to the synchronous state from the asynchronous state. The computer may switch back to the asynchronous state after, for example, the computer system proceeds to update the display at the predefined rate and there is no buffered data with which to update the visual representation. The aforementioned process may repeat throughout the simulation process.

Example Environment

Figure 1:
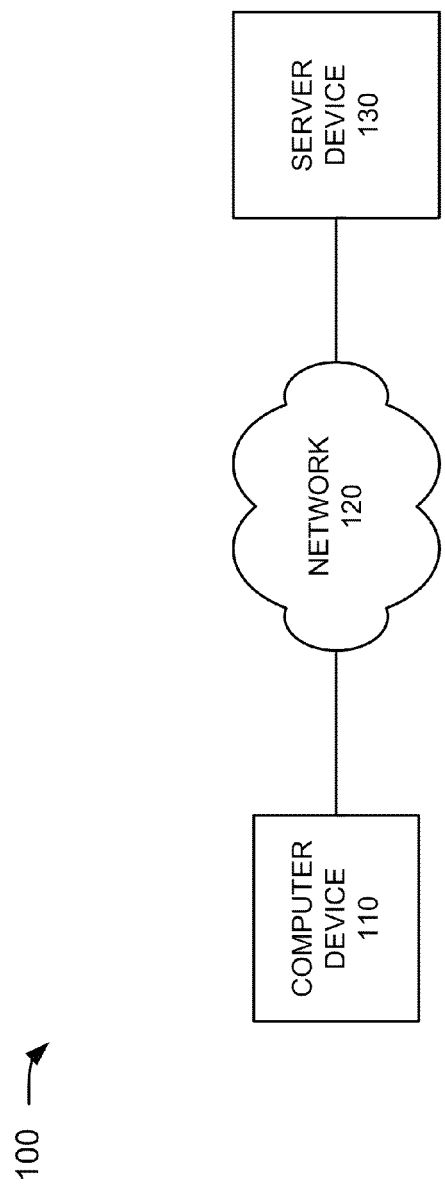
FIG. 1 is a diagram of an example environment in which systems and/or methods described herein may be implemented.

FIG. 1 is a diagram of an example environment 100 in which systems and/or methods described herein may be implemented. Environment 100 may include one or more of the following elements: a computer device 110, a network 120, and a server device 130.

Computer device 110 may represent any device capable of executing a simulation and/or receiving data from network 120. Server device 130 may represent any device capable of executing a simulation and transmitting data to network 120. In one implementation, each one of computer device 110 and server device 130 may take the form of a computer, a server, a smart phone, a personal computer, a laptop, a handheld computer, a portable communication device (e.g., a mobile phone), etc. Computer device 110 and server device 130 may be directly connected to network 120 or indirectly connected through a router, a switch, a bridge, a firewall, a gateway, etc.

Network 120 may represent a single network, multiple networks of a same type, or multiple networks of different types. For example, network 120 may include a direct connection between devices, a local area network (LAN), a wide area network (WAN), a metropolitan area network (MAN), a wireless network, such as a general packet radio service (GPRS) network, an ad hoc network, a public switched telephone network (PSTN), a subset of the Internet, any other network, or any combination thereof.

In one implementation, computer device 110 may run a simulation. Computer device 110 may display a visual representation of the simulation on a display of/connected to computer device 110. Computer device 110 may generate, recognize, process, and/or buffer data generated by the simulation. Computer device 110 may update the display of the visual representation based on the data.

In another implementation, server device 130 may run a simulation. Computer device 110 may display a visual representation of the simulation. Server device 130 may generate data for/using the simulation. Server device 130 may transmit the generated data through network 120 to computer device 110. Computer device 110 may receive the data from network 120, determine that the data is an update for the simulation, and/or update the display of the visual representation for the simulation based on the data. Computer device 110 may buffer the data and/or determine when (e.g., synchronously or asynchronously) to update the display based on updates for the simulation. In yet another implementation, server device 130 may determine when the visual representation should be updated based on the generated data, and transmit the data (synchronously or asynchronously) to computer device 110 based on the determination. Computer device 110 may update the display (synchronously) of the visual representation right after receiving the data from computer device 130.

Embodiments of the invention can support local and/or distributed simulation activities using computing grids, cloud-based computing environments, computing clusters, etc.

Example Device

Figure 2:
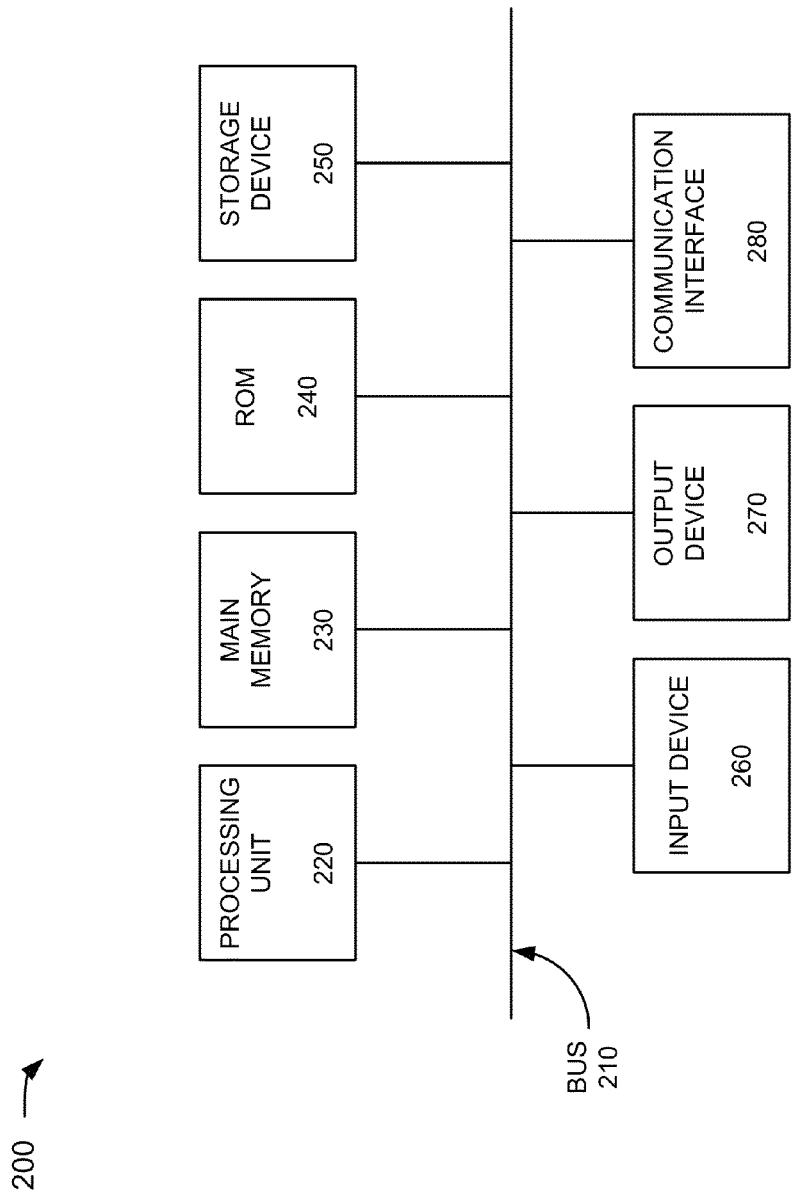
FIG. 2 is a diagram of example components of one or more of the devices of FIG. 1.

FIG. 2 is a diagram of example components of a device 200 corresponding to computer device 110 and/or server device 130. Each one of computer device 110 and/or server device 130 may include one or more devices 200 and/or one or more of each one of the components of device 200.

As shown in FIG. 2, device 200 may include a bus 210, a processing unit 220, a main memory 230, a read-only memory (ROM) 240, a storage device 250, an input device 260, an output device 270, and/or a communication interface 280. In another implementation, device 200 may include additional components, fewer components, different components, or differently arranged components than are shown in FIG. 2. In some implementations, one or more components of device 200 may perform one or more tasks described as being performed by one or more other components of device 200.

Bus 210 may include a path that permits communication among the components of device 200. Processing unit 220 may include a processor, co-processors, a microprocessor, or other types of processing logic that may interpret and execute instructions. Main memory 230 may include a random access memory (RAM) or another type of dynamic storage device that may store information and instructions for execution by processing unit 220. ROM 240 may include a ROM device or another type of static storage device that may store static information and/or instructions for use by processing unit 220. Storage device 250 may include a magnetic and/or optical recording medium and its corresponding drive. In some implementations, main memory 230 or storage device 250 may also be implemented as solid state memory, such as flash-based memory.

Input device 260 may include a mechanism that permits an operator to input information to device 200, such as a keyboard, a mouse, a pen, a single or multi-point touch interface, an accelerometer, a gyroscope, a microphone, voice recognition and/or biometric mechanisms, etc. Output device 270 may include a mechanism that outputs information to the operator, including a display, a printer, a speaker, etc. In the case of a display, the display may be a touch screen display that acts as both an input and an output device. Input device and/or output device 270 may be haptic type devices, such as joysticks or other devices based on touch.

Communication interface 280 may include any transceiver-like mechanism that enables device 200 to communicate with other devices and/or systems. For example, communication interface 280 may include mechanisms for communicating with another device or system via network 120.

As will be described in detail below, device 200 may perform certain operations. Device 200 may perform these operations in response to processing unit 220 executing software instructions (e.g., computer program(s)) contained in a computer-readable medium, such as memory 230, a secondary storage device (e.g., hard disk, CD-ROM, etc.) or other forms of RAM or ROM. A computer-readable medium may be defined as a non-transitory memory device. A memory device may include memory space within a single physical memory device or spread across multiple physical memory devices. The software instructions may be read into main memory 230 from another computer-readable medium, such as storage device 250, or from another device via communication interface 280. The software instructions contained in main memory 230 may cause processing unit 220 to perform processes that will be described later. Alternatively, hardwired circuitry may be used in place of or in combination with software instructions to implement processes described herein. Thus, implementations described herein are not limited to any specific combination of hardware circuitry and software.

Application States

Figure 3:
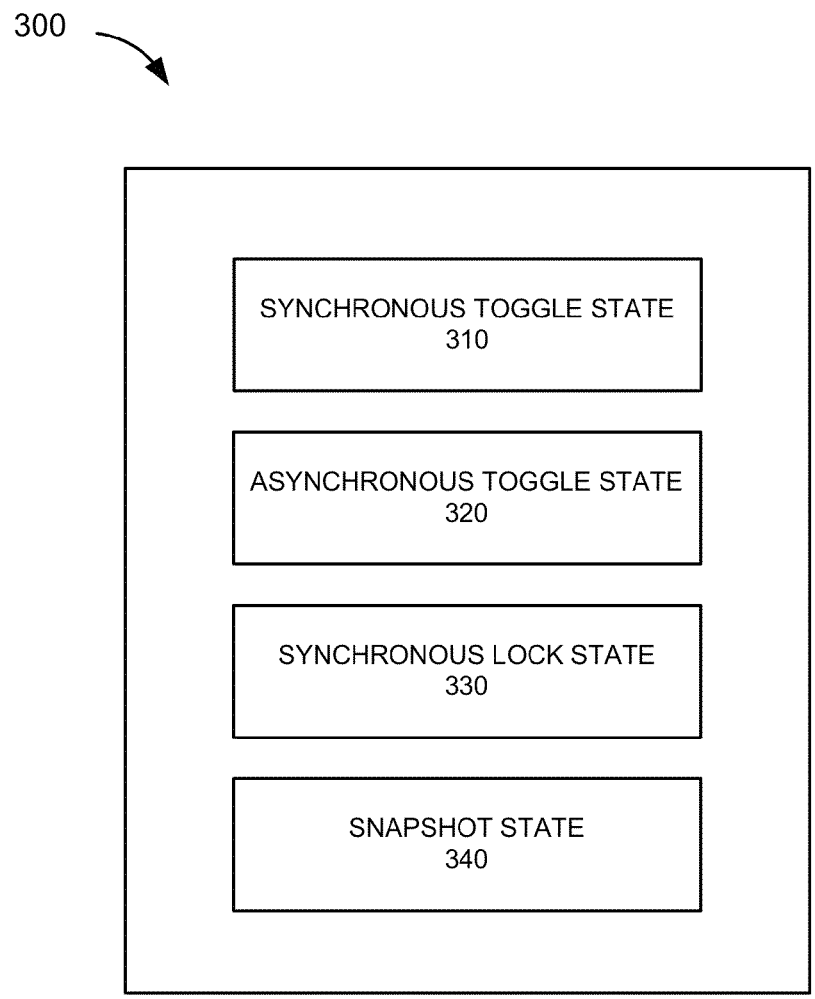
FIG. 3 is a diagram conceptually illustrating example states of an application that is managing visual updates.

FIG. 3 is a diagram conceptually illustrating example states of an application 300 that is managing visual updates. In an embodiment, application 300 may be part of a simulation environment, such as the Simulink® environment which is provided by MathWorks Inc. In other embodiments, application 300 may be a separate application that is operatively coupled to another application, such as an application that produces data used by application 300.

Application 300 may include individual states for managing visual updates, including: a synchronous toggle state 310, an asynchronous toggle state 320, a synchronous lock state 330, and/or a snapshot state 340. One or more applications and/or one or more computer systems may handle/execute each one of the states illustrated in FIG. 3. Application 300 may be initialized to begin updating of a display of a visual representation for a simulation in synchronous toggle state 310. Synchronous toggle state 310 may perform synchronous updates of the visual representation. In other words, synchronous toggle state 310 may update the visual representation every time an update (i.e., new data) is generated/received for the visual representation. Synchronous toggle state 310 may also continuously check whether to switch application 300 to asynchronous toggle state 320 based on whether criteria for switching to asynchronous toggle state 320 are met. The criteria may be predefined for all simulations, may vary for different simulations, may be set by a user, etc.

Application 300 may switch to asynchronous toggle state 320 from synchronous toggle state 310. Asynchronous toggle state 320 may perform asynchronous updates of the visual representation. In other words, asynchronous toggle state 320 may buffer data generated/received for the simulation corresponding to the visual representation. Asynchronous toggle state 320 may, at a predefined rate (e.g., every 45 milliseconds), retrieve the buffered data and update the visual representation based on the retrieved data. Asynchronous toggle state may be configured to retrieve buffered data at a rate that is satisfactory to a user with respect to viewing visual representations. The update rate may be set close to a threshold value that, when exceeded, causes the visual representation to become unsatisfactory to the user (e.g., the visual representation begins to flicker or distort). Asynchronous toggle state 320 may also continuously check whether to switch application 300 back to synchronous toggle state 310, from asynchronous toggle state 320, based on whether criteria for switching to synchronous toggle state 310 are met. Application 300 may switch back to synchronous toggle state 310 when the criteria are met.

In one implementation, a user may enter a synchronous lock request for application 300 to perform only synchronous updates. In another implementation, application 300 may determine based on the data and/or the simulation to perform only synchronous updates until a user instructs otherwise. As a result, in either case, application 300 may switch from synchronous toggle state 310 or asynchronous toggle state 320 to synchronous lock state 330. Synchronous lock state 330 may continuously perform synchronous updates of the display of the visual representation based on updates. Application 300 may not switch from synchronous lock state 330 to any other state (aside from snapshot state 340, as further described below) until the user enters a request to end synchronous lock state 330. In response to the request to end synchronous lock state 330, application 300 may switch back to synchronous toggle state 310.

A user may also enter a snapshot request for application 300 to freeze the display of the visual representation. In response, application 300 may switch from synchronous toggle state 310, asynchronous toggle state 320, or synchronous lock state 330 to snapshot state 340. Snapshot state 340 may buffer data generated/received for the visual representation, but not update the display of the visual representation based on the data. Application 300 may not switch from snapshot state 340 to any other state until the user enters a request to turn off snapshot state 340. In response to the request to turn off snapshot state 340, application 300 may retrieve all of the buffered data for the visual representation and update the display of the visual representation based on the data. Thereafter, application 300 may determine whether to switch to synchronous toggle state 310, asynchronous toggle state 320, or synchronous lock state 330 from snapshot state 340. For example, application 300 may switch back to the state that application 300 was in before the user entered the snapshot request.

Example Processes

Figure 4:
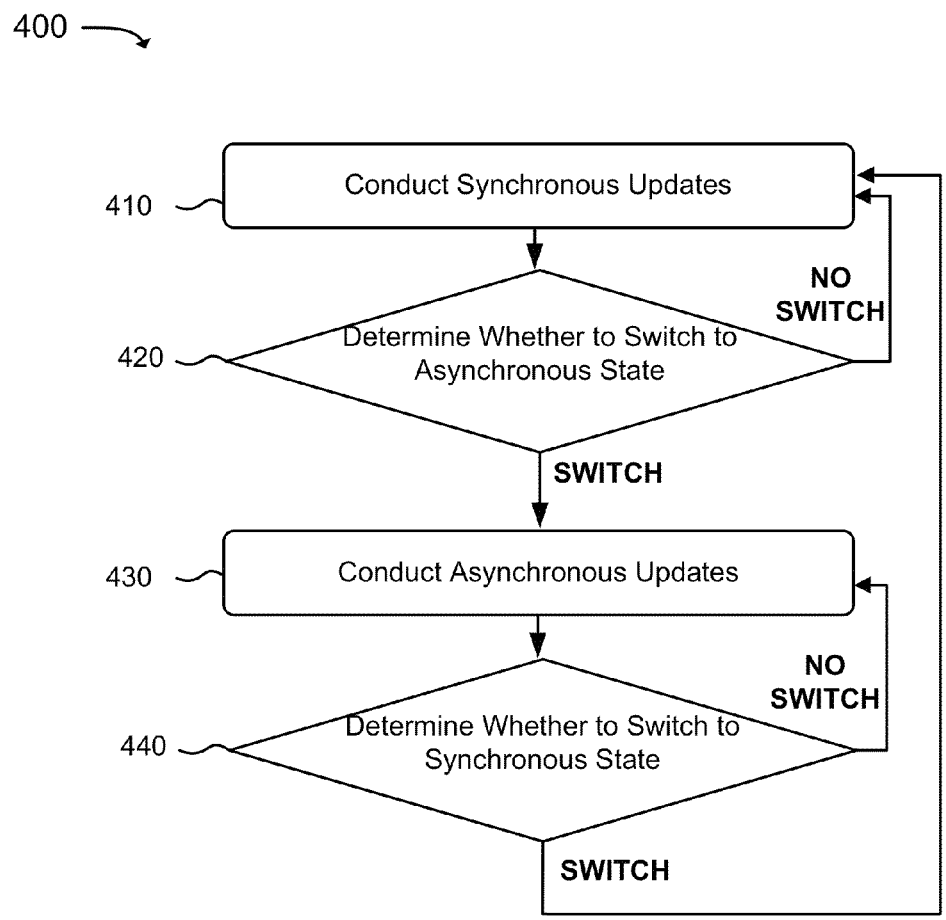
FIG. 4 is a flowchart of an example process for managing visual updates.

FIG. 4 is a flowchart of an example process 400 for managing visual updates. Process 400 may be performed by computer device 110 and/or server device 130.

Process 400 may include conducting synchronous updates (block 410). For example, an application may display a visual representation for a simulation. The application may update the display of the visual representation based on data updates that are generated during the display. The application may begin executing in a synchronous state. The application may receive or generate a new data update (herein, "update"). The update may be in a form of coordinates of a point, a character, a string, a number, or any other form of data change. The application may modify the visual representation to reflect updated information provided by the update. When the application is in the synchronous state, the application may conduct synchronous updates of the visual representation. Conducting synchronous updates means updating the visual representation based on an update in response to receiving/generating the update. The quantity of synchronous updates conducted corresponds to the quantity of updates received.

A determination may be made whether to switch to an asynchronous state (block 420). For example, an application in synchronous toggle state 310 may make a determination whether the application should switch to asynchronous state, controlled by asynchronous toggle state 320. The determination may be made based on whether predefined criteria are met for switching to the asynchronous state from the synchronous state. The criteria may be defined by the application managing updates of a visual representation, by a simulation corresponding to the visual representation that is providing the updates, by a user of the application and/or computer device 110, etc. The criteria may be met when one or more updates are received to update the visual representation at a rate equal to or higher than a fast rate. The fast rate may be a frequency (e.g., 20 Hz) at which a human may not be able to perceive/appreciate changes to the visual representation. The process for determining whether to switch to the asynchronous state from the synchronous state is further described below with reference to FIG. 5. If the application determines not to switch to the asynchronous state, the application may continue to conduct synchronous updates (block 410).

Asynchronous updates may be conducted (block 430). If an application determines to switch to an asynchronous state, the application may begin conducting asynchronous updates. For example, the application may generate or receive data to update a visual representation of a simulation. In the asynchronous state, the application may buffer the data until a time of a next update operation. Update operations may occur based on a fixed rate. For example, the application may update a display of the visual representation at the fixed rate of every 50 milliseconds. The fixed rate for asynchronous updates may be defined by the application managing updates of the visual representation, by the simulation, by a user of the application and/or computer device 110, etc. To determine when the next update operation should occur, the application may measure a wait time from when the last update operation occurred. When the wait time equals the fixed rate, the application may retrieve all of the data that has been buffered since the last update operation. The application may generate an update based on the retrieved data. The application may update the display of the visual representation based on the update. Thereafter, the application may again measure a new wait time and buffer new data until the measured wait time once again equals the fixed rate.

A determination may be made whether to switch to a synchronous state (block 440). For example, an application in asynchronous toggle state 320 may make a determination whether the application should switch back to a synchronous state, controlled by synchronous toggle state 310. While conducting asynchronous updates, the application may make the determination to switch back to the synchronous state when predefined criteria are met, as described further below. The criteria may be defined by the application managing updates of a visual representation, by a simulation corresponding to the visual representation that is providing data for the asynchronous updates, by a user of the application and/or computer device 110, etc. The criteria may be met when the application is no longer receiving data for updates at the fast rate. The application may determine that data is not being received at the fast rate when there is no buffered data to retrieve for one or more scheduled asynchronous updates. If the application determines to switch to the asynchronous state (when the predefined criteria are met), the application may again begin conducting synchronous updates of the simulation in a synchronous state (block 410). If the application determines not to switch to the synchronous state, the application may continue to conduct asynchronous updates (block 430). The process for determining whether to switch to the synchronous state from the asynchronous state is further described below with reference to FIG. 6.

Figure 5:
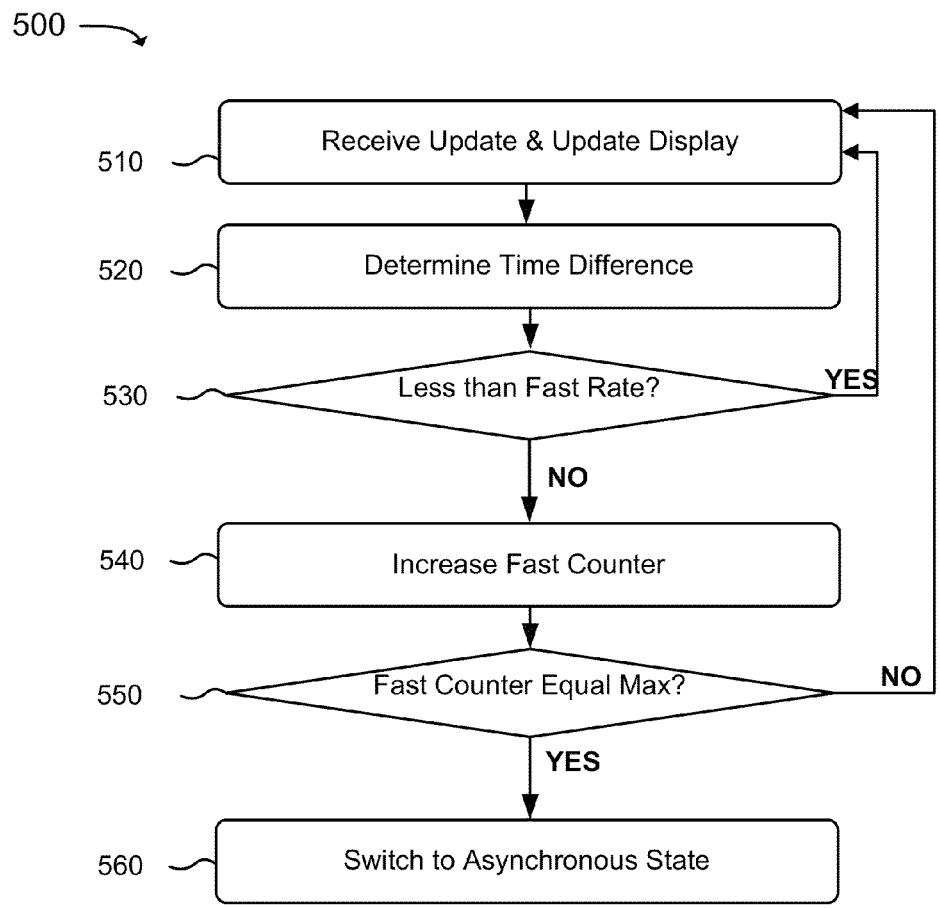
FIG. 5 is a flowchart of an example process for switching from a synchronous state to an asynchronous state.

FIG. 5 is a flowchart of an example process 500 for switching from a synchronous state to an asynchronous state. Synchronous toggle state 310 may perform process 500.

Process 500 may include receiving an update and updating a display (block 510). An application may generate/receive a new update for a simulation. While in synchronous toggle state 310, the application may conduct synchronous updates. Therefore, in response to the existence/receipt of the new update, the application may update the display based on the new update.

A time difference may be calculated (520). For example, each update may have a corresponding time stamp. The time stamp may indicate when an update, of a simulation, was created or received. An application may calculate a time difference of a time stamp of a previous update and a time stamp of a new update. The previous update may have immediately preceded the new update. After calculating the time difference, the application may determine whether the new update matches criteria based on whether the time difference is less than a predefined fast rate (e.g., 50 milliseconds).

If a time difference is less than a fast rate (block 530-YES), then process 500 may proceed to repeat process 500 by waiting to receive an update and update the display in a synchronous state (block 510). If the time difference is not less (i.e., is equal to or greater) than the fast rate (block 530-NO), then process 500 may proceed to increase a fast counter (block 540). The fast counter may indicate a number of consecutive times that time differences corresponding to previous updates have been less than the fast rate. The application may assign a value of zero to the fast counter when a time difference is calculated that is less than the fast rate (block 530-YES).

If a fast counter equals a predefined maximum (block 550-YES), then process 500 may proceed to switch to an asynchronous state (block 560). The predefined maximum (e.g., 3) may be defined by an application managing updates of a visual representation, by a simulation corresponding to the visual representation that is providing data for the synchronous updates, by a user of the application and/or computer device 110, etc. After switching to the asynchronous state, the application may conduct asynchronous updates.

If a fast counter does not equal (i.e., is less than) a predefined maximum (block 550-NO), then process 500 may proceed to repeat process 500 by waiting to receive an update and update the display (block 510). In other words, the application may continue to conduct synchronous updates.

Figure 6:
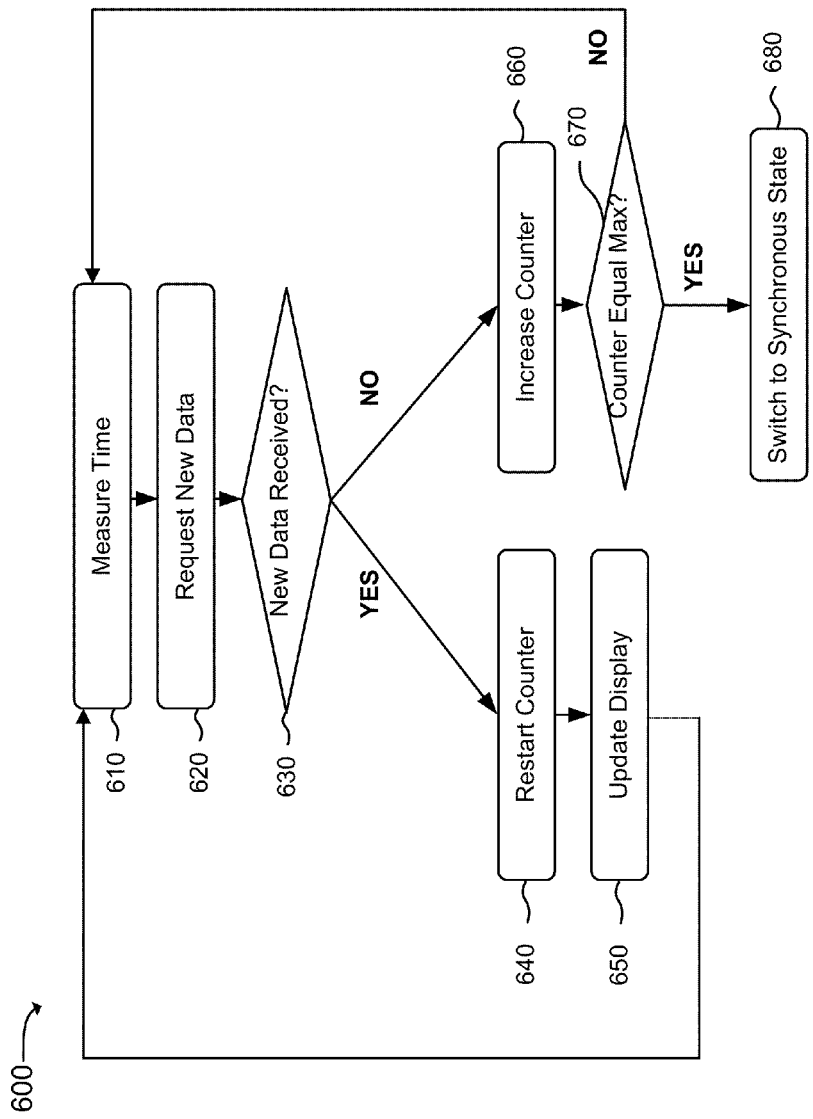
FIG. 6 is a flowchart of an example process for switching from an asynchronous state to a synchronous state.

FIG. 6 is a flowchart of an example process 600 for switching from an asynchronous state to a synchronous state. Asynchronous toggle state 320 may perform process 600.

Process 600 may include measuring a time (block 610). In an asynchronous state, an application may measure a time from when the previous update of a display occurred. The application may determine when the measured time equals a predefined rate for asynchronous updates in the asynchronous state.

New data may be retrieved (block 620). For example, when a measured time equals a predefined rate, an application may determine that an asynchronous update must occur. To do so, the application may form an update based on data that was buffered between a time when a previous update occurred and a current time. The application may retrieve the buffered data for the update. The update may be used for the asynchronous update of a visual representation. The application may determine whether the update matches criteria based on whether new data was successfully retrieved for the asynchronous update.

If new data is retrieved (block 630-YES), a counter may be restarted (block 640). An application may determine whether new data, based on which an update to a visual representation may be made, was buffered. The application may maintain the counter to count a number of consecutive times that the application retrieved data for asynchronous updates and there was no data to retrieve (because no new data was received since the last update was made). If the application determines that data was retrieved (i.e., an update includes new data that may be used to modify the visual representation), the counter may be restarted from zero. In other words, a value of zero may be assigned to the counter to restart counting the number of consecutive times that no new data was retrieved for asynchronous updates.

A display may be updated (block 650). For example, when new data is retrieved for an update, an application may update a display based on new data as part of the asynchronous update. Thereafter, the application may (continue) to measure time (block 610) until the next asynchronous update.

If new data is not retrieved (block 630-NO), a counter may be increased (block 660). For example, the application may determine that no new data has been generated/received since the last asynchronous update. As a result, no new data was buffered and there is no new data to retrieve for an asynchronous update (even if an update is generated, the update will not have any new data to update a visual representation). A counter may indicate a number of consecutive times that no new data was retrieved for asynchronous updates. The counter may be increased by one to reflect that no new data was retrieved during the last retrieval of new data. Thereafter, the application may determine whether the counter is equal to a predefined maximum (e.g., 2). The predefined maximum (e.g., 2) may be defined by an application managing updates of a visual representation, by a simulation corresponding to the visual representation that is providing data for the asynchronous updates, by a user of the application and/or computer device 110, etc.

If the counter equals a predefined maximum (block 670-YES), then process 600 may proceed to switch to a synchronous state (block 680). In the synchronous state, an application may conduct synchronous updates and determine whether to switch back to the asynchronous state.

If the counter does not equal (i.e., is less than) a predefined maximum (block 670-NO), then process 600 may proceed to repeat process 600. An application may continue to measure time (block 610) until another asynchronous update is scheduled based on a fixed rate.

Example Transitions Between States

Figure 7:
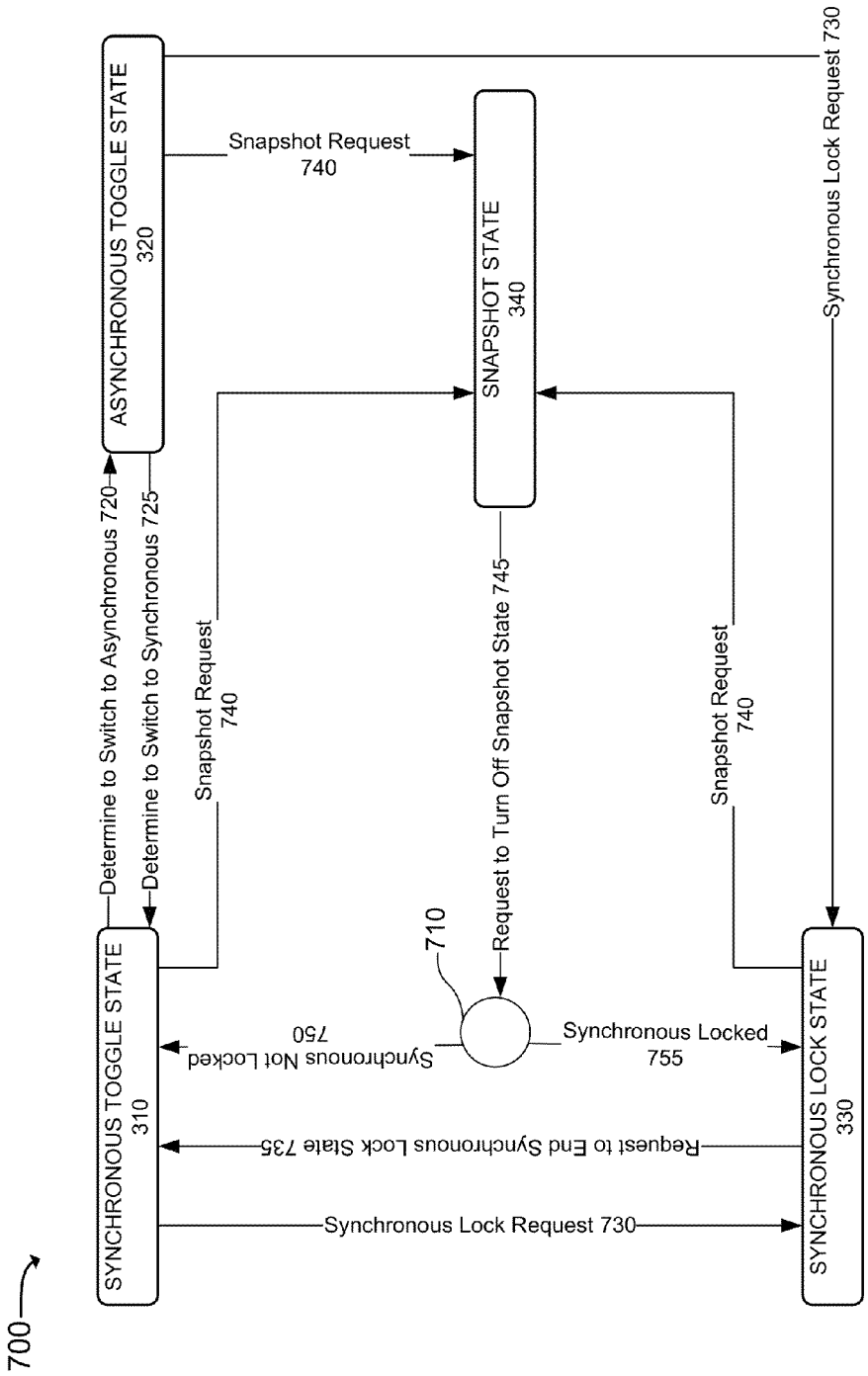
FIG. 7 is a diagram illustrating example transitions between different states that are managing visual updates.

FIG. 7 is a diagram illustrating example transitions between different states that are managing visual updates. For example, an application may conduct a simulation. The application may display a graph based on the simulation. The simulation may generate updates. Each one of the updates may provide coordinates for a new point on the graph. The application may begin updating the display of the graph in synchronous toggle state 310. In synchronous toggle state 310, in response to generating a new update, the application may plot a point on the graph based on the new update. In synchronous toggle state 310, the application may determine that new updates are being generated at a fast rate (e.g., at a rate faster than a threshold) and, accordingly, determine to switch to asynchronous state 720.

After determining to switch to asynchronous state 720, the application may operate in asynchronous toggle state 320. The application may buffer data updates that are generated while the application is in asynchronous toggle state 320. For example, the application may buffer three data updates for new coordinates of three different points before an asynchronous update is made. During the asynchronous update, the application may retrieve the coordinates for the three different points as an update and update the display by plotting the three different points on the graph at the same time. In asynchronous toggle state 320, the application may determine that data is not being received at the fast rate and, accordingly, determine to switch back to synchronous state 725. After determining to switch to synchronous state 725, the application may again operate in synchronous toggle state 310.

A user may enter a synchronous lock request 730 while the application is in synchronous toggle state 310 or asynchronous toggle state 320. The application may switch to synchronous lock state 330 in response to synchronous lock request 730. In synchronous lock state 330, the application may conduct synchronous updates by updating the display of the graph in the same way that the application conducts synchronous updates in synchronous toggle state 310. In other words, in response to receiving/generating a new update, the application may plot a point on the graph to correspond to the update. The application may continue to operate in synchronous lock state 330 (and not make any automatic determinations whether to switch to any other state) until the user enters a request to end synchronous lock state 735. In this example, in response to the request to end synchronous lock state 735, the application may switch to synchronous toggle state 310. In another example, in response to the request to end synchronous lock state 735, the application may switch back to synchronous toggle state 310 or asynchronous toggle state 320.

A user may also enter a snapshot request 740 while the application is in synchronous toggle state 310, asynchronous toggle state 320, or synchronous lock state 330. The application may switch to snapshot state 340 in response to snapshot request 740. In snapshot state 340, the application may freeze the display of the graph at a point in time when snapshot request 740 was received. Any new data updates generated for the graph may be buffered. The application may not switch to any other state until the user enters a request to turn off snapshot state 745. In response to the request to turn off snapshot state 745, the application may retrieve all of the data updates that were buffered after the point in time when snapshot request 740 was received. The application may update the display of the graph based on the retrieved data updates (e.g., graph multiple points based on coordinates that were received as data for the points).

Thereafter, the application may switch to a determination state 710 to determine whether the application was operating in synchronous lock state 330 before the user entered snapshot request 740. If a determination is made that a synchronous is locked 755 (i.e., the application was operating in synchronous lock state 330 before the user entered snapshot request 740), the application may switch from determination state 710 back to the synchronous lock state 330 after receiving the request to turn off snapshot state 745. Otherwise, if a determination is made that a synchronous update is not locked 750, the application may switch from determination state 710 to synchronous toggle state 310. In another implementation, a determination may be made that the application was operating in asynchronous toggle state 320 before the user entered snapshot request 740, and switch from determination state 710 back to asynchronous toggle state 320 after receiving request to turn off snapshot state 745 (not shown in FIG. 7).

Example of Synchronous Updates

Figure 8:
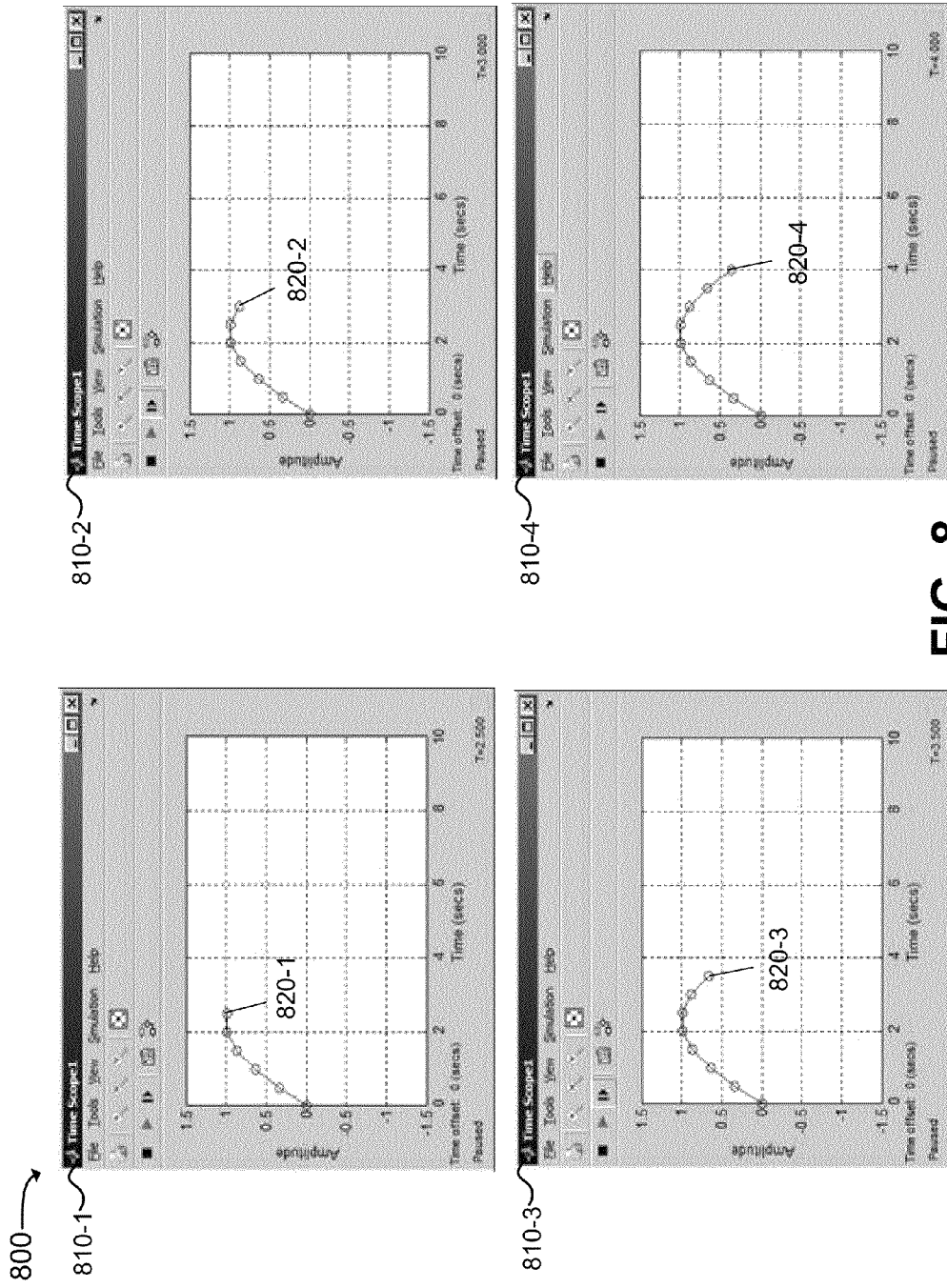
FIG. 8 is a diagram illustrating an example of synchronous updates.

FIG. 8 is a diagram 800 illustrating an example of synchronous updates. Synchronous updating may be preferable over asynchronous updating when data for a simulation is received at a slow rate so that any synchronous update to a visual representation, after receiving any of the data, may be perceived by a user. For example, a user at computer device 110 may execute a simulation to plot a line on a graph. The simulation may generate coordinates for points on a graph. Computer device 110 may receive the coordinates as data and display a visual representation of the line on the graph based on the coordinates. Computer device 110 may begin updating the visual representation in a synchronous state. As a result, computer device 110 may begin by updating the visual representation by plotting a point on the graph after receiving coordinates for the point. The embodiment of the example may be configured to switch from the synchronous state to an asynchronous state when certain criteria are satisfied. For example, criteria may be set that coordinates for three points must be received consecutively, with less than 45 milliseconds between when the coordinates are received for each point, for computer device 110 to switch to an asynchronous state from the synchronous state.

Each one of screenshots 810-1, 810-2, 810-3, and 810-4 may represent a view of the display after each corresponding synchronous update. For example, screenshot 810-1 illustrates a visual representation of a graph. The graph may include a vertical axis that corresponds to amplitude and a horizontal axis that corresponds to time offset. Before an update that resulted in a view of screenshot 810-1, computer device 110 may have received coordinates for five different points. For example, computer device 110 may have received coordinate (0,0) for the first point and coordinate (2, 1) for the fifth point. Computer device 110 may have switched between updating in a synchronous state and updating in an asynchronous state during a time of plotting the five points. Computer device 110 may have switched from a synchronous state to an asynchronous state when the aforementioned criteria are met when, for example, coordinates for the second point were received less than 45 milliseconds after coordinates for the first point were received, coordinates for the third point were received less than 45 milliseconds after the coordinates for the second point were received, and coordinates for the fourth point were received less than 45 milliseconds after the coordinates for the third point were received. Computer device 110 may switch back to synchronous state before receiving coordinates for point 820-1. For example, computer device 110 may have switched from the asynchronous state back to the synchronous state when, for example, no coordinates were received before the first asynchronous update, one second after switching to the asynchronous state, and no coordinates were received before the second asynchronous update, two second after switching to the asynchronous state.

Computer device 110 may receive coordinates (2.5, 1) for point 820-1. After receiving the coordinates for point 820-1, computer device 110 may proceed to update the visual representation of the line on the graph based on the coordinates. As a result, for example, computer device 110 may update the visual representation by generating a new graph for screenshot 810-1 that includes the previous (first) five plotted points and point 820-1. Screenshot 810-1 may represent a view of the display of the visual representation for the simulation after the update corresponding to receiving coordinates for point 820-1.

Thereafter, coordinates for a point 820-2 may be generated. Computer device 110 may receive the coordinates for point 820-2, 1 second after receiving the coordinates for point 820-1. After receiving the coordinates, computer device 110 may update the visual representation for the simulation by generating a new graph for screenshot 810-2 that includes the first five plotted points, point 820-1, and point 820-2. Screenshot 810-2 may represent a view of the display of the visual representation for the simulation after the update corresponding to receiving coordinates for point 820-2.

Computer device 110 may receive the coordinates for point 820-3, 50 milliseconds after receiving the coordinates for point 820-2. After receiving coordinates for point 820-3, computer device 110 may update the visual representation for the simulation by generating a new graph for screenshot 810-3 that includes the first five plotted points, point 820-1, point 820-2, and point 820-3. Screenshot 810-3 may represent a view of the display of the visual representation for the simulation after the update corresponding to receiving coordinates for point 820-3.

Computer device 110 may receive the coordinates for point 820-4, 2 seconds after receiving the coordinates for point 820-3. After receiving coordinates for point 820-4, computer device 110 may update the visual representation for the simulation by generating a new graph for screenshot 810-4 that includes the first five plotted points, point 820-1, point 820-2, point 820-3, and point 820-4. Screenshot 810-4 may represent a view of the display of the visual representation for the simulation after the update corresponding to receiving coordinates for point 820-4.

Example of Asynchronous Updates

Figure 9:
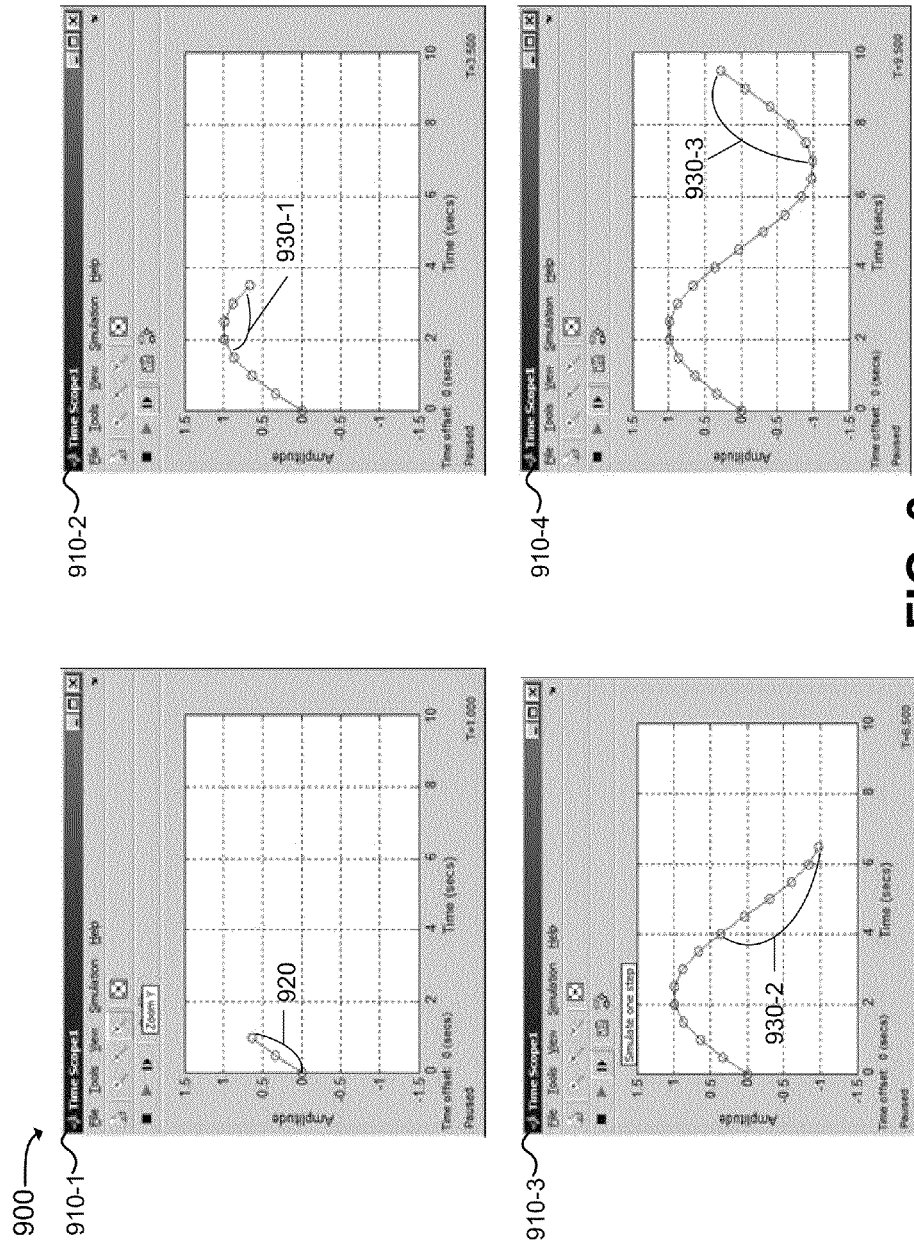
FIG. 9 is a diagram illustrating an example of asynchronous updates.

FIG. 9 is a diagram 900 illustrating an example of asynchronous updates. Asynchronous updating may be preferable over synchronous updating when data for a simulation is received at a fast rate at which a user would be unable to discern any changes to a visual representation of the simulation. During asynchronous updating, computer device 110 does not waste resources by updating the visual representation for the simulation after receiving each individual data at the fast rate. Instead, computer device 110 makes asynchronous updates at a predefined rate, at which the user is able to discern changes to the visual representation, based on all data received between update and a current asynchronous update. For example, a user at computer device 110 may execute a simulation to plot a line on a graph. The simulation may generate coordinates for points on a graph. Computer device 110 may receive the coordinates as data and display a visual representation of the line on the graph based on the coordinates. Computer device 110 may begin updating the visual representation in a synchronous state. Diagram 900 illustrates screenshots 910-1, 910-2, 910-3, and 910-4. Screenshot 910-1 may represent a view of a display of the visual representation at a time when computer device 110 switches to an asynchronous state from the synchronous state.

Criteria may be set to switch to the asynchronous state from the synchronous state when coordinates are received for two consecutive points at a fast rate. In the synchronous state, computer device 110 may receive coordinates for points 920 one at a time and updated the visual representation for the simulation after receiving coordinates for each one of points 920. After receiving points 920, computer device 110 may determine that the criteria are met for switching and switch to the asynchronous state. In the asynchronous state, the visual representation of the simulation may be updated every 45 milliseconds.

In the first 45 milliseconds after switching to the asynchronous state, computer device 110 may receive coordinates for five different points 930-1, for each one of points 930-1 at a time. During the first 45 milliseconds, computer device 110 may buffer points 930-1. When the first 45 milliseconds elapses, computer device 110 may retrieve buffered coordinates for points 930-1 and update the visual representation for the simulation by generating a new graph for screenshot 910-2 that includes points 920 that were displayed in screenshot 910-1 and points 930-1. As a result, computer device 110 does not waste resources by updating the visual representation for the simulation after receiving each individual one of points 930-1. The resources would have been wasted otherwise because the user is unable to discern changes to any visual representation that occur within a span of time less than 45 milliseconds.

Within 45 milliseconds after retrieving coordinates to generate the view for screenshot 910-2, computer device 110 may receive coordinates for six more points 930-2. When the second 45 milliseconds after switching to the asynchronous state elapses, computer device 110 may retrieve buffered coordinates for points 930-2 and update the visual representation for the simulation by generating a new graph for screenshot 910-3 that includes points 920, points 930-1, and points 930-2. Screenshot 910-3 may represent a view of the display of the visual representation for the simulation after the update based on points 910-3.

Within 45 milliseconds after retrieving coordinates to generate the view for screenshot 910-3, computer device 110 may receive coordinates for six more points 930-3. When the third 45 milliseconds after switching to the asynchronous state elapses, computer device 110 may retrieve buffered coordinates for points 930-3 and update the visual representation for the simulation by generating a new graph for screenshot 910-4 that includes points 920, points 930-1, points 930-2, and points 930-3. Screenshot 910-4 may represent a view of the display of the visual representation for the simulation after the update based on points 910-3.

CONCLUSION

The foregoing description of implementations provides illustration and description, but is not intended to be exhaustive or to limit the invention to the precise form disclosed. Modifications and variations are possible in light of the above teachings or may be acquired from practice of the invention.

For example, while series of blocks have been described with regard to FIGS. 4-6, the order of the blocks may be modified in other implementations. Further, non-dependent blocks may be performed in parallel.

Also, the term "user" has been used herein. The term "user" is intended to be broadly interpreted to include, for example, a workstation or a user of a workstation.

It will be apparent that example aspects, as described above, may be implemented in many different forms of software, firmware, and hardware in the embodiments illustrated in the figures. The actual software code or specialized control hardware used to implement these aspects should not be construed as limiting. Thus, the operation and behavior of the aspects were described without reference to the specific software code-it being understood that software and control hardware could be designed to implement the aspects based on the description herein.

Further, certain portions, described herein, may be implemented as "logic" that performs one or more functions. This logic may include hardware, such as an application specific integrated circuit or a field programmable gate array, software, or a combination of hardware and software.

Even though particular combinations of features are recited in the claims and/or disclosed in the specification, these combinations are not intended to limit the disclosure of the invention. In fact, many of these features may be combined in ways not specifically recited in the claims and/or disclosed in the specification. Although each dependent claim listed below may directly depend on only one other claim, the disclosure of the invention includes each dependent claim in combination with every other claim in the claim set.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. One or more non-transitory computer-readable storage media storing instructions, the instructions comprising:
   one or more instructions that, when executed by one or more processors, cause the one or more processors to:
      receive, at a first time, first data,
         the first data being generated based on an application performing a simulation;
      provide, based on the first data and to a display, a visual representation of the simulation for display to a user;
      receive, at a second time, second data,
         the second data being generated based on the application performing the simulation;
      determine that a time difference between the first time and the second time is less than a threshold time difference;
      determine that the second data was received in a synchronous update state based on the time difference between the first time and the second time being less than the threshold time difference;
      conduct a synchronous update of the visual representation of the simulation based on receiving the second data in the synchronous update state;
      receive, at a third time, third data,
         the third data being generated based on the application performing the simulation;
      determine that a time difference between the third time and the second time is not less than the threshold time difference;
      switch to an asynchronous update state, from the synchronous update state, based on the time difference between the third time and the second time not being less than the threshold time difference;
      store the third data in a memory based on switching to the asynchronous update state;
      determine an expiration of a period of time;
      retrieve the third data from the memory based on the expiration of the period of time;
      conduct an asynchronous update of the visual representation of the simulation, in the asynchronous update state, independent of receiving additional data generated based on the application performing the simulation;
      lock, based on receiving a request to lock the display, the display,
         the visual representation of the simulation not being updated when the display is locked;
      receive fourth data;
      buffer the fourth data based on the display being locked;
      unlock, based on receiving a request to unlock the display, the display;
      update the display based on the fourth data and based on unlocking the display;
      determine whether the synchronous update state or the asynchronous update state was in effect prior to the display being locked; and
      selectively switch to the synchronous update state or a synchronous lock state, based on whether the synchronous update state or the asynchronous update state was in effect prior to the display being locked.

2. The one or more non-transitory computer-readable storage media of claim 1, where the one or more instructions to switch to the asynchronous update state from the synchronous update state include:
   one or more instructions that, when executed by the one or more processors, cause the one or more processors to:
      increase a counter based on the time difference between the third time and the second time not being less than the threshold time difference; and
      switch to the asynchronous update state when the counter is equal to a predefined number.

3. The one or more non-transitory computer-readable storage media of claim 1, where the instructions further comprise:
   one or more instructions that, when executed by the one or more processors, cause the one or more processors to:
      measure, after conducting the asynchronous update of the visual representation of the simulation, a wait time;
      request received data when the wait time equals a predefined period of time,
         where the received data is received after switching to the asynchronous update state;
      determine whether the received data comprises new data; and
      update the display based on the received data when the received data comprises the new data.

4. The one or more non-transitory computer-readable storage media of claim 3, where the instructions further comprise:
   one or more instructions that, when executed by the one or more processors, cause the one or more processors to:
      increase a counter when the received data does not comprise the new data; and
      switch to the synchronous update state when the counter is equal to a predefined number.

5. The one or more non-transitory computer-readable storage media of claim 1, where the instructions further comprise:
   one or more instructions that, when executed by the one or more processors, cause the one or more processors to:
      receive a request to switch to a synchronous lock state;
      switch to the synchronous lock state based on the request to switch to the synchronous lock state;
      conduct new synchronous updates of the visual representation of the simulation based on receiving new data;
      receive a request to end the synchronous lock state; and
      switch to the synchronous update state or the asynchronous update state based on the request to end the synchronous lock state.

6. The one or more non-transitory computer-readable storage media of claim 1, where the synchronous update changes information, presented on the display, based on the data, and where the data is one of:
   one or more numbers,
   a matrix of numbers, or
   one or more characters.

7. The one or more non-transitory computer-readable storage media of claim 1, where the instructions further comprise:
   one or more instructions that, when executed by the one or more processors, cause the one or more processors to:
      receive a request to switch to a snapshot state;
      freeze the visual representation of the simulation based on receiving the request to switch to the snapshot state;

receive new data;
   buffering the new data without updating the visual representation of the simulation based on switching to the snapshot state;
receive a request to turn off the snapshot state;
determine whether a request to switch to a synchronous lock state was received before receiving the request to switch to the snapshot state; and
selectively switch to the synchronous lock state or the synchronous state,
   the device switching to the synchronous lock state when the request to switch to the synchronous lock state was received before receiving the request to switch to the snapshot state, and
   the device switching to the synchronous state when the request to switch to the synchronous lock state was not received before receiving the request to switch to the snapshot state.

8. A method comprising:
receiving, at a first time, first data,
   the first data being generated based on an application performing a simulation, and
   receiving the first data being performed by a device;
providing, based on the first data and to a display, a visual representation of the simulation for display to a user,
   providing the visual representation of the simulation being performed by the device;
receiving, at a second time, second data,
   the second data being generated based on the application performing the simulation, and
   receiving the second data being performed by the device;
determining that a time difference between the first time and the second time is less than a threshold time difference,
   determining that the time difference between the first time and the second time is less than the threshold time difference being performed by the device;
determining that the second data was received in a synchronous state based on the time difference between the first time and the second time being less than the threshold time difference,
   determining that the second data was received in the synchronous state being performed by the device;
conducting a synchronous update of the visual representation of the simulation based on the second data being received in the synchronous state,
   conducting the synchronous update of the visual representation of the simulation being performed by the device;
receiving, at a third time, third data,
   the third data being generated based on the application performing the simulation, and
   receiving the third data being performed by the device;
determining that a time difference between the third time and the second time is not less than the threshold time difference,
   determining that the time difference between the third time and the second time is not less than the threshold time difference being performed by the device;
switching to an asynchronous state from the synchronous state based on the time difference between the third time and the second time not being less than the threshold time difference,
   switching to the asynchronous state being performed by the device;
storing the third data in a memory based on switching to the asynchronous state,
   storing the third data being performed by the device;
measuring a wait time after switching to the asynchronous state,
   measuring the wait time being performed by the device;
retrieving the third data from the memory when the wait time equals a time based on a fixed rate associated with updating the visual representation of the simulation,
   retrieving the third data being performed by the device;
updating the visual representation of the simulation based on the third data,
   updating the visual representation of the simulation being performed by the device;
locking, based on receiving a request to lock the display, the display,
   the visual representation of the simulation not being updated when the display is locked, and
   locking the display being performed by the device;
receiving fourth data,
   receiving fourth data being performed by the device;
buffering the fourth data based on the display being locked,
   buffering the fourth data being performed by the device;
unlocking, based on receiving a request to unlock the display, the display,
   unlocking the display being performed by the device;
updating the display based on the fourth data and based on unlocking the display,
   updating the display being performed by the device;
determining whether the synchronous update state or the asynchronous update state was in effect prior to the display being locked,
   determining whether the synchronous update state or the asynchronous update state was in effect being performed by the device; and
selectively switching to the synchronous update state or a synchronous lock state, based on whether the synchronous update state or the asynchronous update state was in effect prior to the display being locked,
   selectively switching being performed by the device.

9. The method of claim 8, where determining that the time difference between the third time and the second time is not less than the threshold time difference includes:
   determining a first receipt time of the third data and a second receipt time of the second data;
   calculating a difference between the first receipt time and the second receipt time; and
   increasing a counter when the difference is not less than the threshold time difference; and
where determining that the third data was received in the asynchronous state includes:
   determining that the third data was received in the asynchronous state when the counter is equal to a predefined number.

10. The method of claim 8, further comprising:
increasing a counter when the memory does not store any data; and
switching to the synchronous state when the counter is equal to a predefined number.

11. The method of claim 10, further comprising:
receiving new data after switching to the synchronous state; and
conducting new synchronous updates of the visual representation of the simulation based on switching to the synchronous state and based on the new data.

12. The method of claim 8, further comprising:
receiving a request to lock the synchronous state;
receiving a request to unlock the synchronous state; and
determining whether to switch to the asynchronous state based on information included in the request to unlock the synchronous state.

13. The method of claim 8, further comprising:
receiving a request to switch to a snapshot state;
freezing the visual representation of the simulation based on receiving the request to switch to the snapshot state;
receiving new data; and
buffering the new data without updating the visual representation of the simulation.

14. The method of claim 13, further comprising:
receiving a request to turn off the snapshot state;
determining whether a request to switch to a synchronous lock state was received before receiving the request to switch to the snapshot state; and
selectively switching to the synchronous lock state or the synchronous state,
    the device switching to the synchronous lock state when the request to switch to the synchronous lock state was received before receiving the request to switch to the snapshot state, and
    the device switching to the synchronous state when the request to switch to the synchronous lock state was not received before receiving the request to switch to the snapshot state.

15. A system comprising:
a processor to:
    receive, at a first time, first data,
        the first data being generated based on an application performing a simulation;
    provide, based on the first data and to a display, a visual representation of the simulation for display to a user;
    receive, at a second time, second data,
        the second data being generated based on the application performing the simulation;
    determine that a time difference between the first time and the second time is less than a threshold time difference;
    operate in a synchronous state based on the time difference between the first time and the second time being less than the threshold time difference;
    conduct a synchronous update of the visual representation of the data using the second data based on operating in the synchronous state;
    receive, at a third time, third data,
        the third data being generated based on the application performing the simulation;
    determine that a time difference between the third time and the second time is not less than the threshold time difference;
    operate in an asynchronous state based on the time difference between the third time and the second time not being less than the threshold time difference;
    store the third data in a memory based on operating in the asynchronous state;
    determine an expiration of a period of time;
    retrieve the third data from the memory based on the expiration of the period of time;
    conduct, using the third data, an asynchronous update of the visual representation of the simulation;
    lock, based on receiving a request to lock the display, the display,
        the visual representation of the simulation not being updated when the display is locked;
    buffer fourth data received while the display is locked, based on the display being locked;
    unlock, based on receiving a request to unlock the display, the display;
    update the display based on the fourth data and based on unlocking the display; and
    selectively switch to the synchronous update state or a synchronous lock state, based on determining whether the synchronous update state or the asynchronous update state was in effect prior to the display being locked.

16. The system of claim 15, where the processor is further to:
    measure, after conducting the asynchronous update, a wait time;
    request an update when the wait time equals a time based on the threshold time difference; and
    update the visual representation of the simulation based on the update when the update comprises new data.

17. The system of claim 16, where the processor is further to:
    determine whether to switch to the synchronous state before updating the visual representation of the simulation based on the update.

18. The system of claim 15, where the processor is further to:
    receive a lock request to switch to the synchronous lock state; and
    conduct updating of the visual representation of the simulation based on the lock request,
        where, when conducting updating of the visual representation of the simulation based on the lock request, the processor is further to:
            conduct synchronous updates of the visual representation of the simulation,
            receive an unlock request, and
            conduct updating of the visual representation of the simulation based on the unlock request.

19. The system of claim 15, where the processor is further to:
    receive a request to switch to a snapshot state;
    freeze the visual representation of the simulation based on receiving the request to switch to the snapshot state;
    receive new data; and
    buffer the new data without updating the visual representation of the simulation.

20. The system of claim 19, where the processor is further to:
    receive a request to turn off the snapshot state;
    determine whether a request to switch to a synchronous lock state was received before receiving the request to switch to the snapshot state;
    switch to the synchronous lock state when the request to switch to the synchronous lock state was received before receiving the request to switch to the snapshot state; and
    switch to the synchronous state when the request to switch to the synchronous lock state was not received before receiving the request to switch to the snapshot state.

* * * * *